United States Patent [19]
Kamps et al.
[11] Patent Number: 4,557,718
[45] Date of Patent: Dec. 10, 1985

[54] AGENT FOR THE SEPARATION OF DISSOLVED AND/OR UNDISSOLVED MATERIALS OF DIFFERENT BUOYANCY DENSITIES OR DENSITIES BY MEANS OF SOLUTIONS OF TRUE METATUNGSTATES

[76] Inventors: Rainer Kamps, Genfenbergstrasse 15, 1000 Berlin 20; Bodo Plewinsky, Tietzenweg 30, Berlin 45; Manfred Miehe, Falkenried 4, 1000 Berlin 33; Klaus Wetz, Eppendorferstieg 4, D 2000 Hamburg 60, all of Fed. Rep. of Germany

[21] Appl. No.: 567,693

[22] Filed: Jan. 3, 1984

[30] Foreign Application Priority Data

Jan. 24, 1983 [DE] Fed. Rep. of Germany ....... 3302691
Feb. 14, 1983 [DE] Fed. Rep. of Germany ....... 3305517

[51] Int. Cl.[4] .............................................. B01D 21/26
[52] U.S. Cl. ............................ 494/37; 156/DIG. 69; 209/3; 209/173; 209/211; 252/60; 423/606
[58] Field of Search ................. 252/60; 156/DIG. 69; 209/60, 199, 173; 423/606; 494/37

[56] References Cited

U.S. PATENT DOCUMENTS

| | | | |
|---|---|---|---|
| 3,608,717 | 9/1971 | Strubel et al. | 209/173 |
| 3,862,029 | 1/1975 | Joyce | 209/173 |
| 4,111,798 | 9/1978 | Peterson et al. | 209/173 |

OTHER PUBLICATIONS

Stock et al., "Charge and Polymerization Degree of the Metatungstate Ion in Aqueous Sodium Chloride Solution by Sedimentation Equilibrium Measurements with the Ultracentrifuge", Kolloid-Z. Z. Polym. 1971, 249(1-2), 1148-54. (Chem. Abstracts 76:132240g).

Plewinsky et al., "Determination of the Molar Mass and Charge Number of Polyelectrolytes with Ultracentrifuge", Colloid Polym. Sci. 1978, 256(1), 37-43. (Chem. Abstracts 88:95637s).

*Primary Examiner*—Paul Lieberman
*Assistant Examiner*—Robert A. Wax

[57] ABSTRACT

The separation of dissolved and/or undissolved materials having different densities or different buoyancy densities can be effected with the aid of agents comprising solutions of true metatungstates. In the case of a separation of materials having different buoyancy densities by means of a density gradient centrifugation, the agent has the form of an aqueous solution of an alkali, ammonium or alkaline earth metal metatungstate and, if desired, may be augmented by the addition of at least one low molecular weight electrolyte. The agent can have a density of up to 3.1 $g.cm^{-3}$, has a low viscosity at high concentrations, and is neutral and chemically insert. In the case of a separation of water-insoluble solid mixtures of different densities, the densities of the solutions of the true metatungstates can be increased up to 4.6 $g.cm^{-3}$ by adding to the solutions high density materials such as sodium tungstate or tungsten carbide of suitable grain size so as to form a suspension.

11 Claims, 8 Drawing Figures

Figure 1:
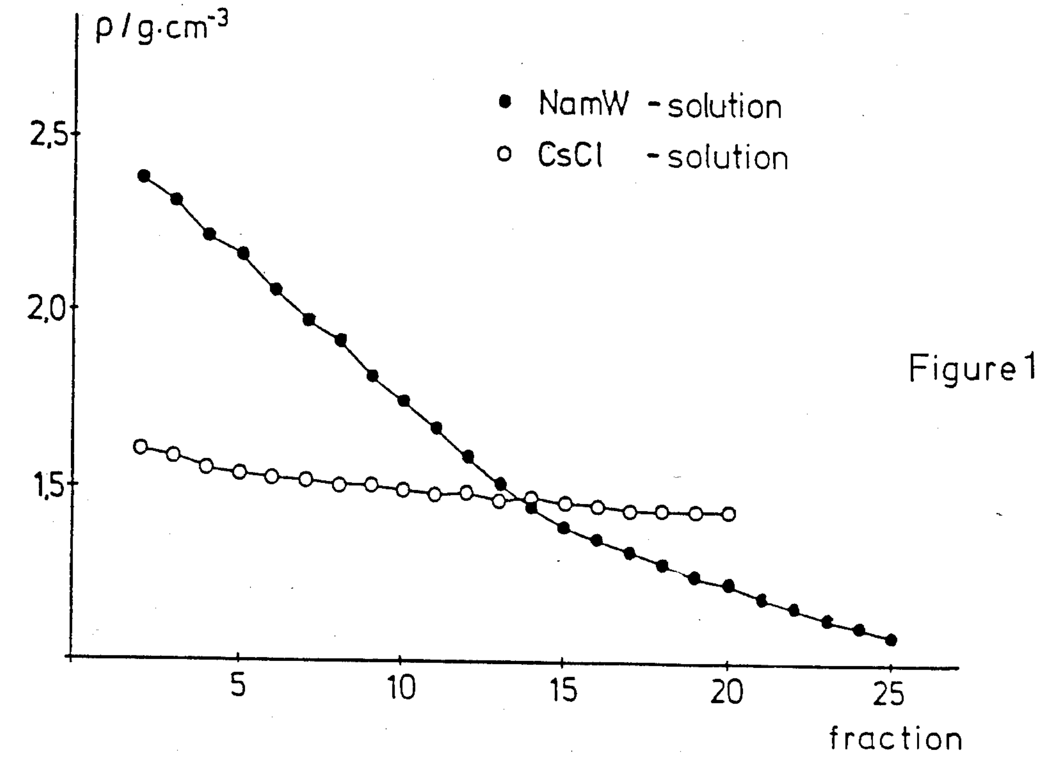

AGENT FOR THE SEPARATION OF DISSOLVED AND/OR UNDISSOLVED MATERIALS OF DIFFERENT BUOYANCY DENSITIES OR DENSITIES BY MEANS OF SOLUTIONS OF TRUE METATUNGSTATES

The density gradient centrifugation is an important analytical and preparative method for the separation and thus identification and recovery of individual components of different buoyancy density, molar mass or sedimentation coefficient.

Thus e.g. the principle of the isopycnic density gradient centrifugation resides in that in the presence of a dissolved material of sufficiently great molar mass under the action of a centrifugal field, there is formed a density gradient. The maximum achievable density differences depend exponentially on the value of the molar mass of the dissolved agent and the centrifugal acceleration.

However, the maximum achievable density is firstly limited by the solubility of the dissolved agent at the location of the maximum density and secondly is inversely proportional to the value of the partial specific volume of the density gradient agent.

In practice such density gradients are either preformed or are formed by equilibrium centrifugation in the centrifuge. The material mixture to be separated can be added either before or after the formation of the density gradient. The materials band at the localities corresponding to their buoyancy density in the density gradient curve.

There have so far been used as density gradient agent for aqueous solutions substances such as in particular cesium chloride and related compounds such as sucrose and Metrizamide.

In view of the circumstances explained existing between molar mass and steepness of the density gradient, it has been attempted to use compounds with a maximum possible molar mass. In addition to good solubility of the compound it must be possible to achieve a high value of the density. Since the adjustment of the sedimentation equilibrium depends essentially on the viscosity of the solution, it is necessary that also with high concentrations of the density gradient agent there exists a minimum possible viscosity. Cesium chloride with a molar mass of 168 $g.mol^{-1}$ allows densities up to a maximum of 2.00 $g.cm^{-3}$ at room temperature. In the intention to increase the molar mass and thus achieve steeper density gradients, there was developed the Metrizamide (2-(3-acetamido-5-N-methylacetamido-2.4.6-tri-iodo benzamido)-2-desoxy-D-glucose) with a molar mass of 789 $g.mol^{-1}$. The maximum attainable density is 1.45 $g.cm^{-3}$. Metrizamide solutions are subject to bacterial degradation and the manufacturers warn against attempts aimed at a processing and recovery of used solutions. Metrizamide is very expensive, so that numerous per se desirable investigations cannot be performed in view of the costs involved. Cesium chloride is less expensive but in connection with preparative work there are still involved substantial costs.

It is the object of the present invention to propose a novel agents for the density gradient centrifugation which overcomes the disadvantages of the prior known agent and has in particular the following properties: relatively high molar mass together with good solubility and therefrom resulting high density, further low viscosity at high density, non-toxic and in solution neutral and chemically inert.

It is a further object of the present invention to provide a novel agent for the separation of water insoluble solids of different densities.

It was found surprisingly that the first stated objective can be achieved by the use of alkali, ammonium and alkaline earth metatungstates (binary density gradient centrifugation) or, if desired, under the addition of a low molecular weight electrolyte like sodium chloride or magnesium chloride (ternary density gradient centrifugation).

These isopolytungstates are the so-called true metatungstates characterized by the Keggin structure. Thus e.g. sodium or magnesium metatungstate do have the formulas $Na_6(H_2W_{12}O_{40})$ metatungstate and $Mg_3(H_2W_{12}O_{40})$ and molar masses of 2986 $g.mol^{-1}$ and 2921 $g.mol^{-1}$.

Sodium and magnesium metatungstates also have high solubility in water. In the case of the sodium metatungstate a mass portion of 80 percent results in a density of 3.12 $g.cm^{-3}$ at 20° C. The relatively low viscosity of the alkali and alkaline earth metatungstates results in a rapid adjustment of the sedimentation equilibrium. The alkali, ammonium and alkaline earth metatungstates are the only stable polytungstates which are simultaneously monomolecular in solution, and with the exception of ammonium metatungstate the solutions are neutral and are aprotic in a pH range of 2 to 10. Metatungstates are also soluble in other hydrophilic solvents such as methanol.

Metatungstate solutions tend to oversaturation, and in the case of the sodium and magnesium metatungstates one can work with high rotor frequency, without having to take into account the possibility of a crystallization. Metatungstate solutions are also thermally stable and can be treated in an autoclave.

The manufacture of metatungstates is effected in a rather simple manner by the reaction of tungsten trioxide with alkali or alkaline earth hydroxide. For the manufacture e.g. of sodium metatungstate there is used a concentrated sodium hydroxide solution to which is added under stirring an aqueous sodium trioxide suspension. After the suspension has been kept under refluxing conditions for a number of hours, it is filtered, evaporated and crystallized. If desired, a further recrystallization can be effected in order to obtain an extremely high purity. The alkali, ammonium and alkaline earth metatungstates can be stored indefinitely at room temperature.

As a result of the steep density gradients obtained by e.g. sodium metatungstate solutions it is possible to achieve separations and measurements of high molecular weight compounds, such as sedipur (copolymer on the basis of acryl amide and sodium acrylate), DNA (from thymus of the calf), immune gammaglobulin (IgG of rabbit), murein (cell membrane of staphyloccocus aureus) etc. with medium rotor frequencies corresponding to a medium centrifugal acceleration of 80 000 g.

Schlieren photographs of sedipur-containing solutions which are at a sedimentation equilibrium show very sharply formed peaks in sodium metatungstate solution, whereas the same are blurred in cesium chloride solution. By means of the inventive use of metatungstate it is possible to investigate also substances with very small buoyancy densities, and by the use of e.g. methanol as solvent one can also achieve density values as low as 0.8 $g.cm^{-3}$.

Investigations have shown that different proteins result in different buoyancy densities, this probably being a result of the fact that such compositions are characterized by different bond strengths with metatungstate ions depending on their charge. Thus the density gradient centrifugation of proteins can be used as a preparative separation method by the inventive use of metatungstate solutions.

The buoyancy densities of nucleic acids in aqueous sodium metatungstate solutions are subtantially smaller than in cesium chloride solutions. This results from the fact that the nucleic acids do not bond metatungstate ions. Because of the high molar mass of the metatungstates investigations of nucleic acids can be performed at low rotor frequencies of e.g. 20 000 $min^{-1}$. Accordingly, one can use in aqueous solution interference optics of the analytical ultracentrifuge.

The invention will further be illustrated by means of the enclosed drawings in which the various figures represent the following:

FIG. 1: Comparison of two different density gradient agents, sodium metatungstate and cesium chloride, in an aqueous solution after adjustment of the sedimentation equilibrium. The density $\rho$ is plotted as a function of the fraction member; the temperature is 7° C., the rotor frequency 30.000 $min^{-1}$, radius of the meniscus 4.60 cm, and the radius of the bottom 8.90 cm (NamW-=sodium metatungstate).

Figure 2:
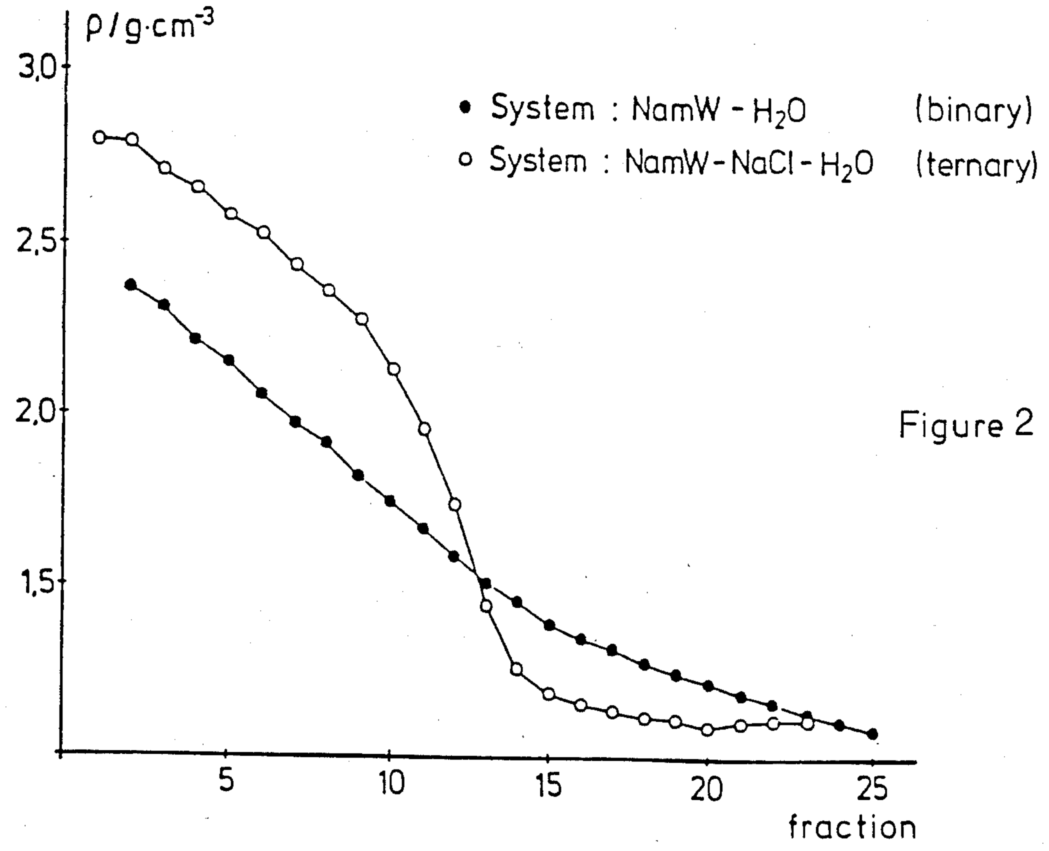

FIG. 2: Comparison of the sedimentation behaviour of sodium metatungstate in aqueous solution (binary system) and of an aqueous sodium chloride-containing sodium metatungstate solution (ternary system). The operating conditions are the same as in FIG. 1).

Figure 3:
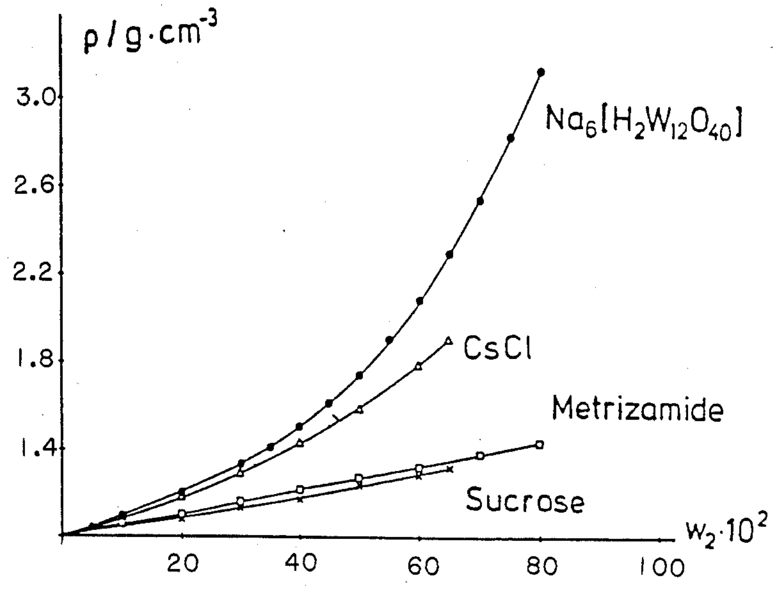

FIG. 3: The density as a function of the mass portion of different density gradient agents in aqueous solution at 20° C.

Figure 4:
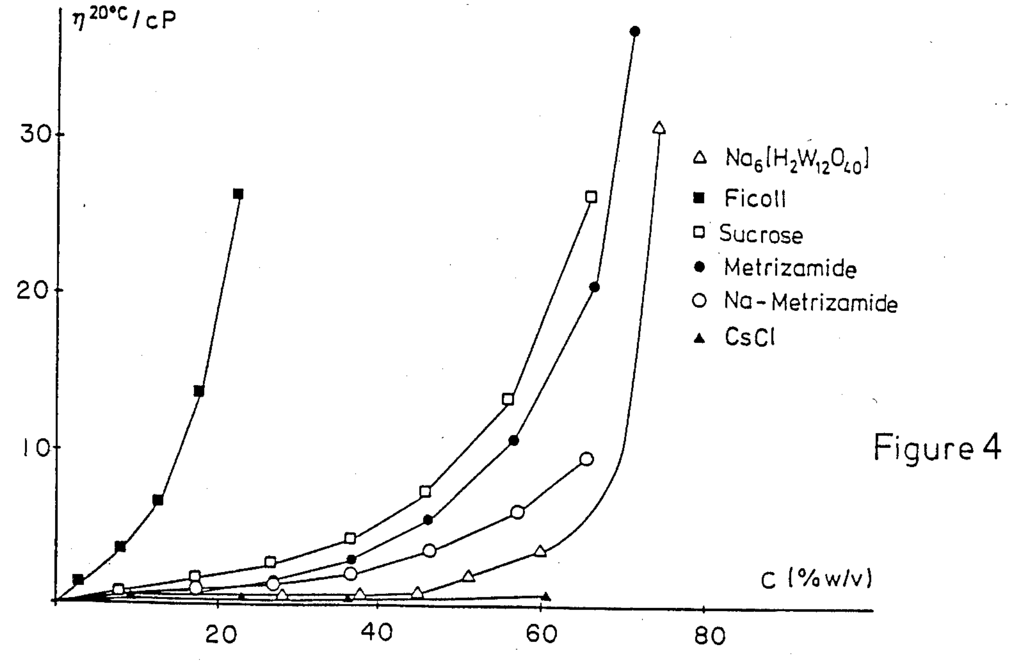

FIG. 4: Viscosity as a function of the mass volume ratio of different density gradient agents in aqueous solution at 20° C.

Figure 5:
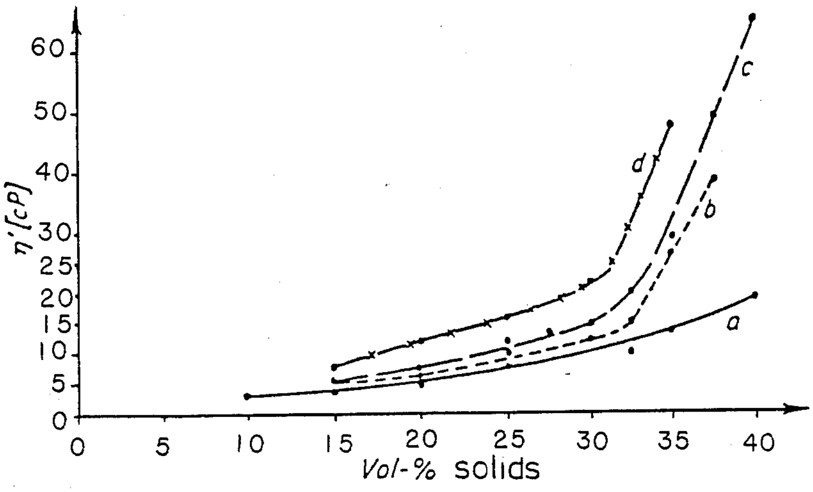

FIG. 5: The viscosity of heavy suspensions as a function of the solid volume portion for different heavy suspensions (a) baryte—60 μm; (b) magnetite—200 μm; (c) ferrosilicon—fresh—200 μm; (d) ferrosilicon aged—200 μm.

Figure 6:
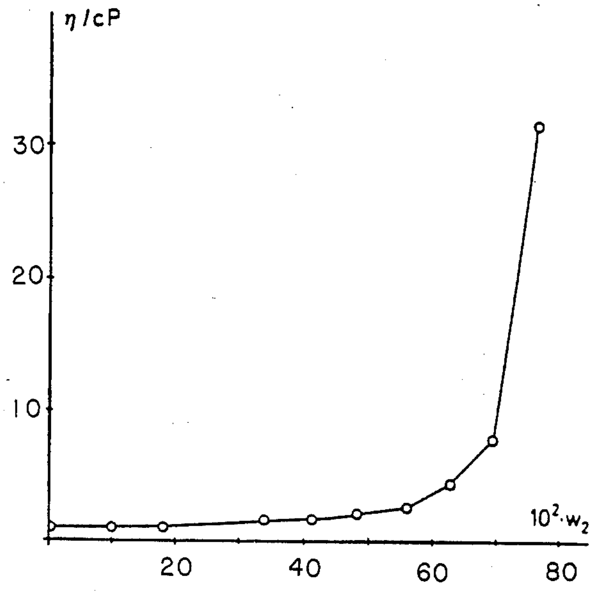

FIG. 6: The viscosity of aqueous sodium metatungstate solutions as a function of the mass portion at 20° C.

Figure 7:
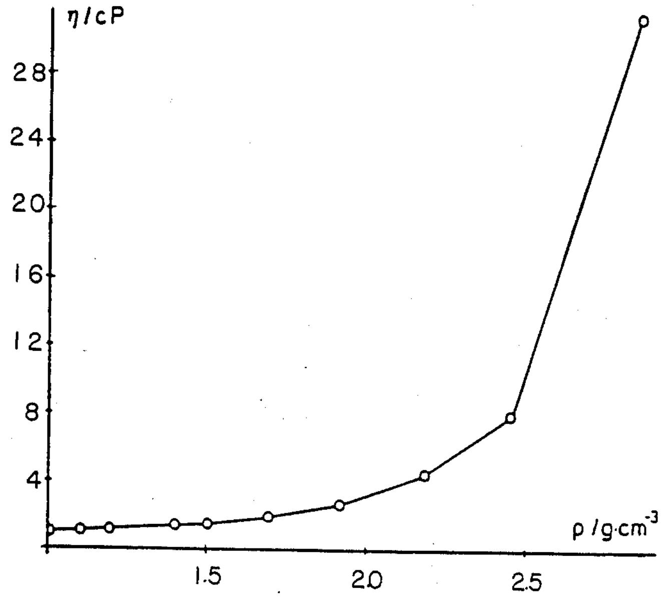

FIG. 7: The viscosity of aqueous sodium metatungstate solutions as function of the density at 20° C.

Figure 8:
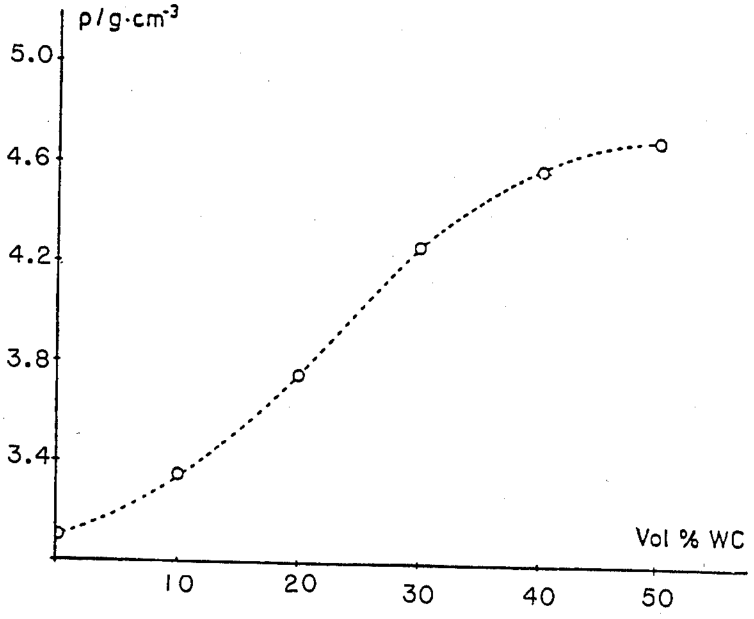

FIG. 8: Density of the heavy suspension: sodium metatungstate solution/tungsten carbide as a function of the solid volume portion of the tungsten carbide starting from a saturated aqueous sodium metatungstate solution.

The invention will further be explained comparatively with the prior art.

EXAMPLE 1

Formation of the density gradient of an aqueous metatungstate solution and an aqueous cesium chloride solution (binary system).

Because of the substantially high molar mass of e.g. sodium metatungstate (2986 $g.mol^{-1}$) such substance sediments out more readily than other, lower molar mass substances under otherwise same conditions. There is thus formed a substantially steeper density gradient with the inventive compound. The respective results are shown in FIG. 1, which shows on the ordinate the density and the fraction number on the abscissa.

EXAMPLE 2

Formation of the density gradient of an aqueous sodium chloride-containing sodium metatungstate solution (ternary system).

Electrolytes in pure water as solvent sediment out as a result of the dissociation substantially less than non-electrolytes of same molar mass. The addition of one or several foreign electrolytes results, in so far as the foreign electrolyte does have a small molar mass, substantially in a sedimentation behaviour of the electrolyte comparable to that of a non-electrolyte of same molar mass. This effect increases with increasing charge number of the heavy ion of the electrolyte. As a result of the high charge number of the metatungstate ion, thus, the addition of sodium chloride has a great influence on the sedimentation behaviour of the inventive compound. FIG. 2 shows the data obtained.

EXAMPLE 3

Density gradient centrifugation of sedipur in aqueous sodium metatungstate solution in comparison to an aqueous cesium chloride solution.

Sedipur is a water-soluble copolymer of acryl amide and sodium acrylate and has a mol mass distribution of $5\times10^5$ to $3\times10^6$ $g.mol^{-1}$.

In a cesium chloride density gradient is obtained a relatively high buoyancy density of 1.41 $g.cm^{-3}$, starting with an initial mass portion of cesium chloride of 39% and working with a rotor frequency of 56.000 $min^{-1}$. In a sodium metatungstate density gradient a buoyancy density of 1.00 $g.cm^{-3}$ *is obtained at a rotor frequency of* 56.000 $min^{-1}$, with only a sodium metatungstate mass portion of 0.25% being required. The results of these investigations are shown in the following table I:

TABLE I

| | Sedipur in sodium metatungstate solution | Sedipur in cesium chloride solution |
|---|---|---|
| rotor frequency | 56.000 $min^{-1}$ | 56.000 $min^{-1}$ |
| mass % | 0.25 | 39 |
| temperature | 25° C. | 25° C. |
| buoyancy density | 1.00 g. $cm^{-3}$ | 1.41 g. $cm^{-3}$ |
| rotor type | SW 65 | SW 65 |

EXAMPLE 4

Comparison of the sedimentation behaviour of a DNA in a cesium chloride and a sodium metatungstate density gradient.

According to the literature there has been obtained, in a cesium chloride density gradient for DNA, a buoyancy density of about 1.7 $g.cm^{-3}$ (rotor frequency about 50.000 $min^{-1}$), the mass portion of cesium chloride being 56%.

In the sodium metatungstate density gradient there is found a buoyancy density of 1.046 $g.cm^{-3}$ at rotor frequencies of only 20.000 to 28.000 $min^{-1}$, the mass portion of sodium metatungstate being only 5%.

The results are summarized in the following table II.

TABLE II

| | DNA (phage) in cesium chloride solution | DNA (calf thymus) in sodium metatungstate solution |
|---|---|---|
| rotor frequency | 51.000 $min^{-1}$ | 20.000 to 28.000 $min^{-1}$ |
| mass portion | 56% | 5% |

TABLE II-continued

| | DNA (phage) in cesium chloride solution | DNA (calf thymus) in sodium metatungstate solution |
|---|---|---|
| buoyancy density | 1.699 g. $cm^{-3}$ | 1.046 g. $cm^{-3}$ |
| temperature | 25° C. | 25° C. |
| use of the interference optics | not possible | possible |
| rotor type | SW 65 | SW 65 |

FIG. 3 shows the maximum achievable densities versus the mass portion firstly for the compound according to the prior art, and secondly for the inventive compound. This graph impressively demonstrates the great density increase achieved by the present invention. FIG. 4 shows, likewise comparatively to the prior art, a comparison of the favorable viscosity values achieved by the present invention versus the content of the density gradient agent.

EXAMPLE 5

Comparison of the sedimentation behaviour of an immune gammaglobulin (IgG) and the protein envelope of the polio virus in a cesium chloride and sodium metatungstate density gradient.

Investigations of an immune gammaglobulin (rabbit) and the protein envelope (Kapsid) of the polio virus in a cesium chloride density gradient result in respective buoyancy densities of 1.30 $g.cm^{-3}$ and 1.29 $g.cm^{-3}$.

A separation of this protein or protein complex is not possible in a cesium chloride density gradient because of the almost identical partial specific volumina which are inversely proportional to the buoyancy densities.

When using a sodium metatungstate density gradient it is found, however, that IgG and the virus kapsid result in completely different buoyancy densities and thus can be separated preparatively. The results are shown in the following table III.

TABLE III

| | buoyancy density in $Na_6(H_2W_{12}O_{40})$ | buoyancy density in cesium chloride |
|---|---|---|
| IgG | 1.14 g. $cm^{-3}$ | 1.30 g. $cm^{-3}$ |
| virus protein | 1.97 g. $cm^{-3}$ | 1.29 g. $cm^{-3}$ |
| rotor frequency | 30.000 $min^{-1}$ | 56.000 $min^{-1}$<br>40.000 $min^{-1}$ |
| temperature | 7° C. | 7° C. |

The inventive agent can be used quite generally with all applicable methods and thus also for any modified form of the density gradient centrifugation.

The invention further relates to an agent having densities of up to 3.1 $g.cm^{-3}$, and upon addition of high density auxiliary agents, like e.g. tungsten carbide, having composite densities of up to about 4.6 $g.cm^{-3}$, for use in the separation of solid mixtures from each other or in the separation of the components of such mixtures where the densities of the components are below and above 3.1 $g.cm^{-3}$ respectively or below and above 4.6 $g.cm^3$.

The present invention is suitable for the separation of any water insoluble mixtures, the components of which have differing densities.

Heavy liquids are among others the Clerici solution, a mixture of thallium formate and thallium malonate, which, in view of the toxic character of thallium compounds, can be used only on a laboratory scale.

According to German Offenlegungsschrift No. 29 20 859 there has become known for the separation of diamonds from accompanying gravel the use of a suspension of tungsten carbide powder in heavy halogenated hydrocarbons, like tetrabromo ethane, tribromo methane and diiodo methane. Such process has, however, not been introduced into practice.

The further objective to be achieved by the present invention resides in the provision of agents which render it possible to effect such separations with a minimum expenditure taking into account the means, methods and agents involved.

This objective is achieved by the present invention in that as separating agent there is used an alkali, ammonium or alkaline earth metatungstate solution of suitable concentration or density, here too the agents involved being true metatungstates with Keggin structure.

Thus e.g. sodium metatungstate is characterized by an extremely good solubility in water and there can be obtained homogenous solutions of 78 mass percent, vide FIG. 3. It is of importance that even saturated metatungstate solutions are characterized by only low viscosities. While the viscosity of high density suspensions with a solids content of 35 percent by volume generally is in the region of about 30 cP, compare FIG. 5, such a value is reached by sodium metatungstate solutions only at a mass portion of about 75%. With a mass portion of 70% the viscosity is below 10 cP, compare FIG. 6. FIG. 7 shows the density of aqueous sodium metatungstate solutions versus their viscosities, and one sees that an already relatively high density of 2.5 $g.cm^{-3}$ corresponds to a viscosity of only 10 cP.

Since the metatungstate solution are true solutions, which at high density show low viscosities, not only is it possible to work with them statically, i.e. under the influence of the gravity field of the earth, but also when using suitable centrifugal accelerations there can be obtained separations of solids. The use of the usual high density suspensions substantially restricts this possibility. The use of metatungstate solutions allows a rapid and almost quantitative separation of water insoluble mixtures with different densities. The separation process itself can be observed visually since metatungstate solutions are colorless and transparent.

When using a saturated aqueous e.g. sodium metatungstate solution one obtains a clear, transparent solution with a density of 3.1 $g.cm^{-3}$ at room temperature. One need not be concerned with a crystallization, since alkali, ammonium and alkaline earth metatungstate solutions tend to an oversaturation.

In order to possibly increase the densities of such homogenous, aqueous solutions one can, in view of the favorable viscosities of metatungstate solution, add additional solids like e.g. tungsten carbide. Such suspensions can be used as high density suspensions for e.g. the sink and float technology. A rapid sedimentation of the solids is not observed since there is initially used already a high density of 3.0 $g.cm^{-3}$. The high density suspensions are stable for a relatively long period, can be used for static or continuous processes, and are non-toxic and thus are ecologically very acceptable.

In FIG. 8 is shown the density of a high density suspension of a saturated sodium metatungstate solution and tungsten carbide as a function of the solids content. As can be derived from this figure there is obtained with a volume portion of 40% tungsten carbide, a density of 4.6 $g.cm^{-3}$.

Since zinc blende with a density of 3.9–4.2 $g.cm^{-3}$ as main component of zinc and galena with a density of 7.4–7.6 g.cm$^{-3}$ usually occur together in lead ore minerals, such ores are of particular importance. By the use, in accordance with the present invention, of e.g. a sodium metatungstate solution in a float-sink device, a separation of this type of galena-zinc blende/gangue is substantially more effective than when working according to the prior art, because substantially smaller particles are separated. This applies in particular when a centrifugal force is applied.

Since the solution can be stored indefinitely, a regeneration is not required.

The invention is further illustrated by means of the following examples.

EXAMPLE 6

Separation of gold-containing quartz mixture by using an aqueous sodium metatungste solution according to the principle of the float-sink process.

50 g quartz of a grain size of about 0.2–0.7 mm are mixed with 0.03 g gold of a grain size of about 0.1–0.5 mm. By means of an automatic mixer there is obtained a random mixture.

This mixture is firstly slurried with water and then there are added 25 ml water. Subsequently there are added portions of solid sodium metatungstate. In order to achieve as far as possible flotation of the quartz, there is used an almost saturated metatungstate concentration. The gold found at the bottom is washed with water, dried and weighed. One obtains 0.028 g gold corresponding to a yield of 93%.

EXAMPLE 7

Separation of a diamonds-containing quartz mixture by using an aqueous sodium metatungstate solution according to the principle of the float-sink process.

The example 6 procedure is repeated with the there shown parameters, and instead of gold there are used three diamonds with a weight of 0.2 g each. Simultaneously, with the floatation of the quartz the diamonds sediment out promptly without there being required a shaking of the mixture.

EXAMPLE 8

Density separation of a mixture of quartz and sanidin in a homogenous aqueous sodium metatungstate solution.

A mixture consisting of quartz and sanidin with a grain size of 0.2–0.8 mm is placed with 10 ml $H_2O$ in a beaker. Solid sodium metatungstate is added in portions. After a short shaking both minerals are observed. This is repeated until after sufficient addition of sodium metatungstate the quartz begins to sediment out and sanidin begins to float. After again shaking the whole mixture is transferred into a funnel which has been previously calibrated with precisely the same amount of quartz as is present in the mixture. After about one hour one can, by reading the calibration marks, find the amounts of quartz having separated from the mixture. At the meniscus the floated mineral is removed, washed with water, dried and weighed on an analytical balance.

The results can be derived from the following table.

| mixture consisting of | density of the mineral g. cm$^{-3}$ | separation in g |
|---|---|---|
| 8 g quartz | 2.65 | about 7.2 |
| 2 g sanadin | 2.54–2.57 | about 1.7 |

EXAMPLE 9

Pre-separation of the ore metals galena and zinc blende from the gangue quartz and feldspar by the float-sink process.

10 g of a galena mineral with substantial mixtures of zinc blende (origin Ireland) are ground to grain sizes of 0.2 to 1.5 mm and there are additionally added 10 g quartz with a grain size of 0.2–1.0 mm. This mixture is slurried with 50 ml water and there is added solid sodium metatungstate in portions. By the increasing density of the solution quartz and feldspar float. There is added somewhat more metatungstate and the mixture is transferred into a funnel. The length of the funnel is 30 cm, the outflow having a length of 20 cm and a diameter of 3 mm. It is observed that galena with a density of 7.2–7.6 g.cm$^{-3}$ sediments out much faster than zinc blende with a density of 3.9–4.2 g.cm$^{-3}$. There is firstly formed a layer of pure galena and later a layer of almost pure zinc blende. Both sediments can be clearly differentiated as a result of the color differences in the colorless metatungstate solution.

For the quantitative evaluation of the separation the sediment of galena and zinc blende and the floated gangue are washed and weighed. The data result in a practically full separation.

What is claimed is:

1. In a process for the separation of dissolved and/or undissolved materials of different buoyancy densities by means of a density gradient centrifugation, wherein the materials to be separated are contained in a quantity of a liquid; the improvement which comprises the use, as at least a part of said quantity of liquid, of an aqueous solution of an alkali, ammonium or alkaline earth metal metatungstate.

2. In a process according to claim 1, the improvement that said solution further contains a quantity of at least one low molecular weight electrolyte, the molecular weight of which is on the order of magnitude of the molecular weights of sodium chloride, magnesium chloride and the like.

3. In a process according to claim 1, the improvement that said solution further contains a quantity of at least one low molecular weight electrolyte, the molecular weight of which is on the order of magnitude of the molecular weights of sodium chloride, magnesium chloride and the like and the cation of which corresponds to the cation of the alkali, ammonium or alkaline earth metal metatungstate.

4. In a process for the separation of water insoluble materials of different densities by means of a float-sink technique, wherein the materials to be separated are contained in a quantity of a liquid; the improvement which comprises the use, as at least a part of said quantity of liquid, of an aqueous solution of an alkali, ammonium or alkaline earth metal metatungstate.

5. In a process according to claim 4, the improvement that said solution has a density which is about in the middle between the densities of the respective materials to be separated.

6. In a process according to claim 4, the improvement that said solution is a saturated solution having a density of about 3.1 g.cm$^{-3}$.

7. In a process according to claims 1, 2, 3, 4, 5, or 6, the improvement that said solution is a solution of sodium metatungstate.

8. In a process according to claims 2 or 3, the improvement that said low molecular weight electrolyte is sodium chloride.

9. In a process according to claims 4, 5 or 6, the improvement that said solution further contains a high density material in granular form suspended in said solution to increase the density of the solution to about 4.6 $g.cm^{-3}$.

10. In a process according to claim 9, the improvement that said high density material is selected from the group consisting of tungsten carbide and sodium tungstate.

11. In a process according to claim 4, 5 or 6, the improvement that during the separation said solution is subjected to the application of centrifugal force.

* * * * *